(12) United States Patent
Klassen et al.

(10) Patent No.: US 11,578,736 B2
(45) Date of Patent: Feb. 14, 2023

(54) SYSTEM AND METHOD FOR DETERMINING FRICTION INFORMATION

(71) Applicant: Festo SE & Co. KG, Esslingen (DE)

(72) Inventors: Daniel Klassen, Esslingen (DE); Gerhard Gommel, Notzingen (DE)

(73) Assignee: Festo SE & Co. KG, Esslingen (DE)

( * ) Notice: Subject to any disclaimer, the term of this patent is extended or adjusted under 35 U.S.C. 154(b) by 134 days.

(21) Appl. No.: 17/230,198

(22) Filed: Apr. 14, 2021

(65) Prior Publication Data

US 2021/0324883 A1 Oct. 21, 2021

(30) Foreign Application Priority Data

Apr. 15, 2020 (DE) .......................... 102020204735.9

(51) Int. Cl.
F15B 19/00 (2006.01)
F15B 15/08 (2006.01)
F15B 11/00 (2006.01)

(52) U.S. Cl.
CPC .............. *F15B 19/00* (2013.01); *F15B 15/08* (2013.01); *F15B 19/002* (2013.01); *F15B 11/006* (2013.01)

(58) Field of Classification Search
CPC ....... F15B 19/00; F15B 19/002; F15B 11/006
See application file for complete search history.

(56) References Cited

U.S. PATENT DOCUMENTS

| | | | | |
|---|---|---|---|---|
| 4,939,922 A * | 7/1990 | Smalley | ................ | G01N 19/02 73/9 |
| 5,337,262 A * | 8/1994 | Luthi | ...................... | F15B 19/00 73/40 |
| 7,021,191 B2 * | 4/2006 | Moler | .................... | G05B 19/43 91/393 |
| 7,047,152 B2 * | 5/2006 | Horch | ...................... | G05B 5/01 702/183 |
| 7,620,522 B2 * | 11/2009 | Bredau | ................ | F15B 19/005 73/1.72 |
| 11,454,261 B2 * | 9/2022 | Klassen | ................ | F15B 19/007 |
| 2004/0078168 A1 * | 4/2004 | Horch | ...................... | G05B 5/01 702/181 |

FOREIGN PATENT DOCUMENTS

| | | | |
|---|---|---|---|
| DE | 60110838 T2 | 2/2006 | |
| DE | 102018200066 A1 * | 7/2019 | ............ F15B 19/005 |
| DE | 102018200066 A1 | 7/2019 | |
| EP | 1812718 A1 | 8/2007 | |

\* cited by examiner

*Primary Examiner* — Thomas E Lazo
(74) *Attorney, Agent, or Firm* — Hoffmann & Baron, LLP (57) ABSTRACT

A system including a pneumatic actuator having an actuator element, the system further including a compressed-air provision device which is configured to carry out a closed-loop position control of the actuator element by applying compressed air to the pneumatic actuator. The compressed-air provision device is further configured to carry out an assistance procedure in which the actuator element is set in an oscillation movement, pressure values and position values are detected, and, on the basis of the detected pressure values and the detected position values, friction information and/or mass information is determined and/or verified.

17 Claims, 4 Drawing Sheets

SYSTEM AND METHOD FOR DETERMINING FRICTION INFORMATION

BACKGROUND OF THE INVENTION

The invention relates to a system comprising a pneumatic actuator which can be acted upon by compressed air and which has an actuator element. The system further comprises a compressed-air provision device configured to perform a closed-loop position control of the actuator element by applying compressed air to the pneumatic actuator to position the actuator element in a desired position.

The compressed-air provision device comprises, for example, a valve terminal. The pneumatic actuator is, for example, a pneumatic drive cylinder.

The system is suitably used in industrial automation, for example to position a drive object, such as a tool, a workpiece and/or a machine part, via the actuator element.

The pneumatic actuator comprises one or more pressure chambers which, within the closed-loop position control, are pressurized by the application of compressed air to effect the positioning of the actuator element. Closed-loop position control by means of compressed air pressurization is also referred to as servo-pneumatics.

The compressed-air provision device can usefully be used for a variety of different applications and/or together with different pneumatic actuators. In order to enable a good interaction between the compressed-air provision device and the pneumatic actuator, it is advantageous if the compressed-air provision device has friction information describing a friction occurring during the positioning of the actuator element and/or mass information describing a mass to be set in motion during the positioning of the actuator element. For example, the compressed-air provision device 4 takes the friction information and/or the mass information into account for the closed-loop position control of the actuator element.

Exemplarily, the friction information and/or the mass information may be entered into the compressed-air provisioning device by a user at the point of use (for example, during commissioning of the system), for example, into an application program used to provide the closed-loop position control.

SUMMARY OF THE INVENTION

It is an object of the invention to modify the system mentioned at the beginning in such a way that it becomes easier for a user to achieve a good interaction between the compressed-air provision device and the pneumatic actuator.

The object is solved by a system comprising a pneumatic actuator which can be acted upon by compressed air and has an actuator element, and a compressed-air provision device which is configured to carry out a closed-loop position control of the actuator element by applying compressed air to the pneumatic actuator, in order to set the actuator element in a desired position. The compressed-air provision device is configured to execute an assistance procedure and, within the assistance procedure, to set the actuator element in an, in particular sinusoidal, oscillation movement by applying compressed air to the pneumatic actuator, in which oscillation movement the actuator element moves alternately in a first direction of movement and in a second direction of movement, to detect pressure values of the compressed air and position values of the actuator element during the oscillation movement, and to determine and/or verify the friction information and/or the mass information on the basis of the detected pressure values and the detected position values. The oscillation movement may also be referred to as oscillatory motion.

It may be difficult for the user to determine the friction information and/or the mass information by himself. The assistance procedure expediently provides the function that the friction information and/or the mass information is automatically determined by the compressed-air provision device, based on the oscillation movement of the actuator element. In particular, the compressed-air provision device is configured to determine the friction information and/or the mass information fully automatically by means of the assistance procedure.

In particular in cases where the user enters the friction information and/or the mass information manually, it may happen that (in particular due to a misconception or an input error) the entered friction information and/or mass information is not correct, i.e. in particular not adapted to the system. The assistance procedure expediently provides the function to verify the friction information and/or mass information (in particular entered by the user).

Thus, the assistance procedure serves to ensure that the correct friction information and/or the correct mass information is present. By providing the correct friction information and/or correct mass information, a good interaction between the compressed-air provision device and the pneumatic actuator can be achieved. For example, taking into account the friction information and/or mass information, an accurate and/or fast closed-loop position control of the actuator element can be achieved.

The invention further relates to a method for operating the system described above. The method comprises the step of: executing the assistance procedure.

Expediently, the method is adapted in correspondence to a further development of the system.

BRIEF DESCRIPTION OF THE DRAWINGS

Exemplary details and exemplary embodiments are explained below with reference to the figures. Thereby shows.

DETAILED DESCRIPTION

Figure 1:
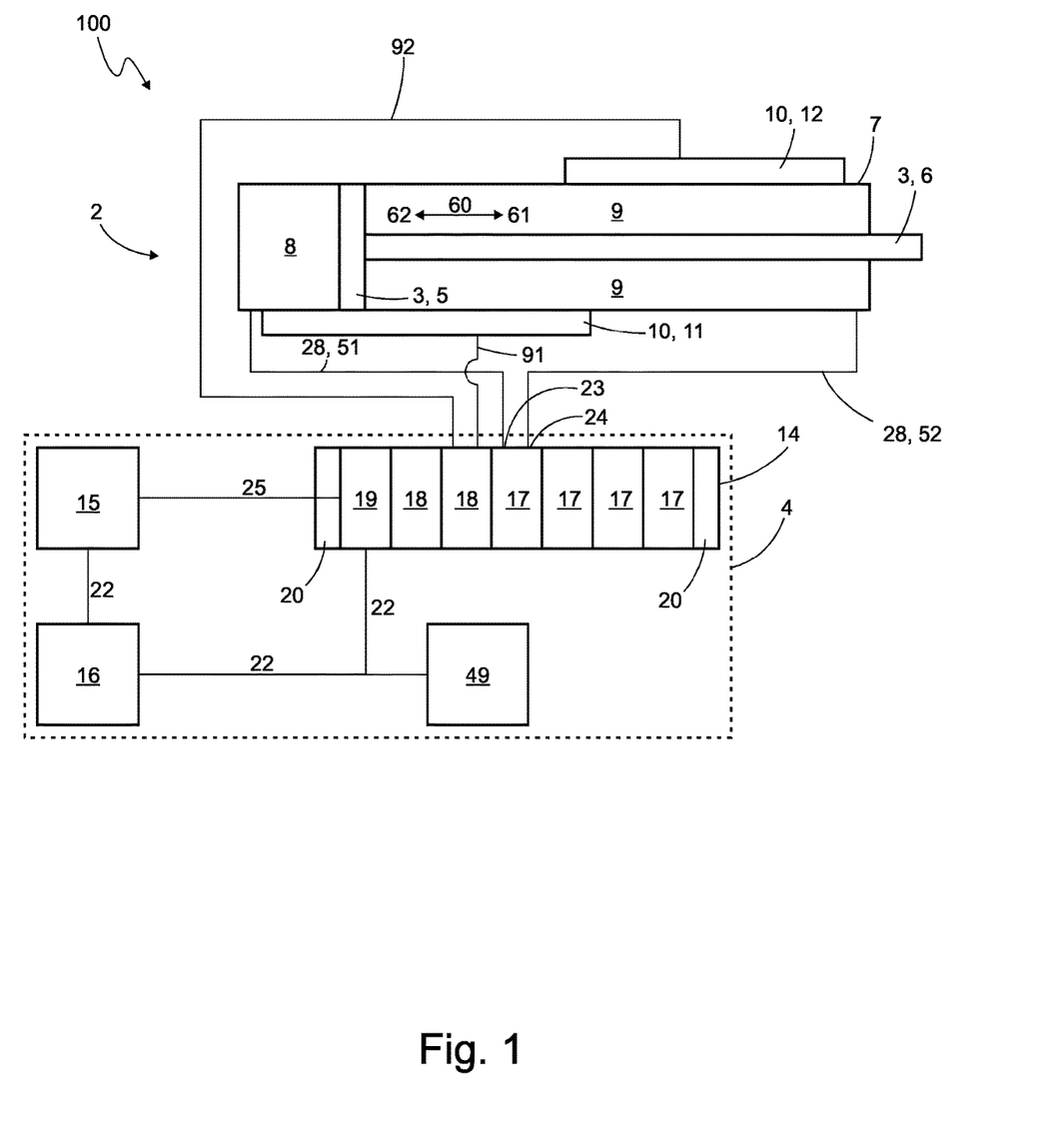
FIG. 1 a schematic view of a system with a compressed-air provision device, a tube arrangement and a pneumatic actuator, FIG. 2 a schematic view of a valve device, FIG. 3 a diagram of an oscillation movement, FIG. 4 a diagram of a non-optimized friction curve and FIG. 5 a diagram of an optimized friction curve.

FIG. 1 shows a system 100 comprising a pneumatic actuator 2, which can be impinged by compressed air, and a compressed-air provision device 4. Exemplarily, system 100 further comprises a tube arrangement 28 connecting the compressed-air provision device 4 to the pneumatic actuator 2.

The pneumatic actuator 2 has an actuator element 3. The compressed-air provision device 4 is configured to perform a closed-loop position control of the actuator element 3 in order to position the actuator element 3 in a desired position. As part of the closed-loop position control, the compressed-air provision device 4 supplies compressed air to the actuator 2 via the tube arrangement 28 in order to move the actuator element 3 into the desired position.

The system 100 is suitably used in industrial automation, for example to position, via the actuator element 3, a drive object, such as a tool, a workpiece and/or a machine part.

The compressed-air provision device 4 comprises the valve arrangement 14, via which the compressed air for the closed-loop position control of the actuator 2 is provided. Exemplarily, the valve arrangement 14 is designed as a valve terminal. A valve terminal may also be referred to as valve island. Alternatively, the valve arrangement 14 can also be designed as a single valve or as a different valve device.

On the valve arrangement 14 two pressure outputs 23, 24 are provided for providing the compressed air. Each of the two pressure outputs 23, 24 is pneumatically connected to a respective pressure chamber 8, 9 of the pneumatic actuator 2. The valve arrangement 14 can aerate and de-aerate the two pressure outputs 23, 24 independently of each other.

In an alternative embodiment, the actuator 2 has only a single pressure chamber. In this alternative embodiment, the pressure chamber is connected to a pressure outlet.

The valve arrangement 14 has a pressure sensor arrangement 29 (shown in FIG. 2) with pressure sensors with which the pressure at the pressure outlets 23, 24 and/or the pressure in a de-aeration port 26 and/or an aeration port 27 can be measured. These pressure sensors are expediently arranged on the valve arrangement 14, in particular on the valve terminal.

Exemplarily, the valve arrangement 14 comprises a plurality of modules, e.g. valve modules 17 and/or I/O modules 18. The valve arrangement 14 further comprises a control unit 19, which is preferably also designed as a module. The valve arrangement 14 expediently has a carrier body 20, in particular a carrier plate, on which the control unit 19, the valve modules 17 and/or the I/O module 18 are arranged.

The valve arrangement 14 is exemplarily designed as a series module arrangement and can in particular also be referred to as a valve island. The aforementioned modules are in particular series modules, which are preferably designed in the form of plates. In particular, the valve modules 17 are designed as valve plates. The series modules are expediently arranged in a series, in particular along the longitudinal axis of the valve arrangement 14.

Exemplarily, the compressed-air provisioning device 4 further comprises a higher-level controller 15 and/or optionally a cloud server 16 and/or a user device 49.

The valve arrangement 14 is expediently communicatively connected to the higher-level controller 15 and/or the cloud server 16. Preferably, the valve arrangement 14 is connected to the higher-level controller 15 via a bus 25, in particular a local bus, for example a field bus, and/or optionally connected to the cloud server 16 via a wide-area network 22, for example the Internet.

The valve arrangement 14 is communicatively connected to a position sensor device 10 of the actuator 2, in particular via the I/O module 18. Exemplarily, the valve arrangement 14 is communicatively connected to the position sensor device 10 via one or more communication lines 91, 92. Expediently, position values detected by the position sensor device 10 are provided to the control unit 19, the higher-level controller 15 and/or the cloud server 16. Furthermore, expediently, pressure values of the pressure sensors 43, 44, 45, 46 are also provided to the control unit 19, the higher-level controller 15 and/or the cloud server 16.

Exemplarily, the pneumatic actuator 2 is designed as a drive, in particular as a drive cylinder. The pneumatic actuator 2 exemplarily comprises an actuator body 7, the actuator element 3 and two pressure chambers 8, 9. It is expedient that the two pressure chambers 8, 9 can be supplied with compressed air separately from each other. The pneumatic actuator 2 is designed in particular as a double-acting actuator. Alternatively, the pneumatic actuator 2 can also have only one pressure chamber and accordingly be designed as a single-acting actuator.

The actuator body 7 is preferably designed as a cylinder and has an inner volume. The actuator element 3 comprises, for example, a piston 5 and/or a piston rod 6. The piston 5 is arranged in the actuator body 7 and divides the inner volume of the actuator body 7 into the two pressure chambers 8, 9.

The pneumatic actuator 2 expediently comprises the position sensor device 10. The position sensor device 10 serves in particular to detect a position of the actuator element 3. The position sensor device 10 provides position values that map the position of the actuator element 3. The position sensor device 10 is preferably designed as an analog position transmitter. Exemplarily, the position sensor device 10 is arranged on the outside of the actuator body 7. The position sensor device 10 comprises, for example, two position sensor units 11, 12, which are arranged distributed along the movement path of the actuator element 3. Exemplarily, the position sensor units 11, 12 together cover the entire movement path of the actuator element 3.

Each position sensor unit 11, 12 can, for example, comprise one or more sensor elements (not shown in the figures), in particular magnetic sensor elements, for example Hall sensor elements. Expediently, a magnet is arranged on the actuator element 3, the magnetic field of which can be detected by the magnetic sensor elements.

It is expedient that the position sensor device 10 is designed to detect the position of the actuator element 3 over the entire movement path of the actuator element 3.

On the pneumatic actuator 2 there is expediently no pressure sensor, in particular no pressure sensor for measuring a pressure in one of the pressure chambers 8, 9.

Expediently, the system 100 comprises the tube arrangement 28 through which the compressed-air provision device 4, in particular the valve arrangement 14, is pneumatically connected to the pneumatic actuator 2. A first tube 51 pneumatically connects the first pressure output 23 to the first pressure chamber 8, and a second tube 52 pneumatically connects the second pressure output 24 to the second pressure chamber 9. In an alternative embodiment in which the pneumatic actuator 2 has only one pressure chamber, the tube arrangement 28 expediently comprises only one tube.

The higher-level controller 15 is exemplarily designed as a programmable logic controller, PLC, and is communicatively connected to the valve arrangement 14, in particular to the control unit 19. Expediently, the higher-level controller 15 is further connected to the cloud server 16, in particular via a wide-area network 22, preferably via the Internet. The higher-level controller 15 is expediently designed to provide a setpoint signal that specifies the desired position to which the actuator element 3 is closed-loop controlled as part of the closed-loop position control.

The user device 49 is exemplarily a mobile device, for example a smartphone, a tablet computer and/or a notebook. Further, the user device 49 may be a desktop computer, for example a PC. The user device 49 is expediently communicatively connected to the control unit 19, the cloud server 16 and/or the higher-level controller 15, in particular via a wide area network 22, for example the Internet. The user device 49 is configured in particular for user input of friction information and/or mass information. The user device 49 can expediently be used to access a user interface provided, for example, on the cloud server 16, the controller 15 and/or the control unit 19. The user interface is expediently a web interface. In particular, the user interface is used for inputting the friction information and/or the mass information by the user. Further, the user interface preferably serves to select, activate, and/or load onto the control unit 19 an application program that provides the closed-loop position controller and/or the assistance procedure, which will be discussed further below. Further, the user device 49 is suitably configured to operate and/or display the assistance procedure.

The cloud server 16 is expediently located remotely from the valve arrangement 14 and/or the pneumatic actuator 2, in particular at a different geographical location. Preferably, the cloud server 16 is configured to provide an application program that is used to provide the closed-loop position control and/or the assistance procedure. The application program may be loaded from the cloud server 16 to the higher-level controller 15 and/or the control unit 19, expediently in response to a user input made with the user device 49.

Figure 2:
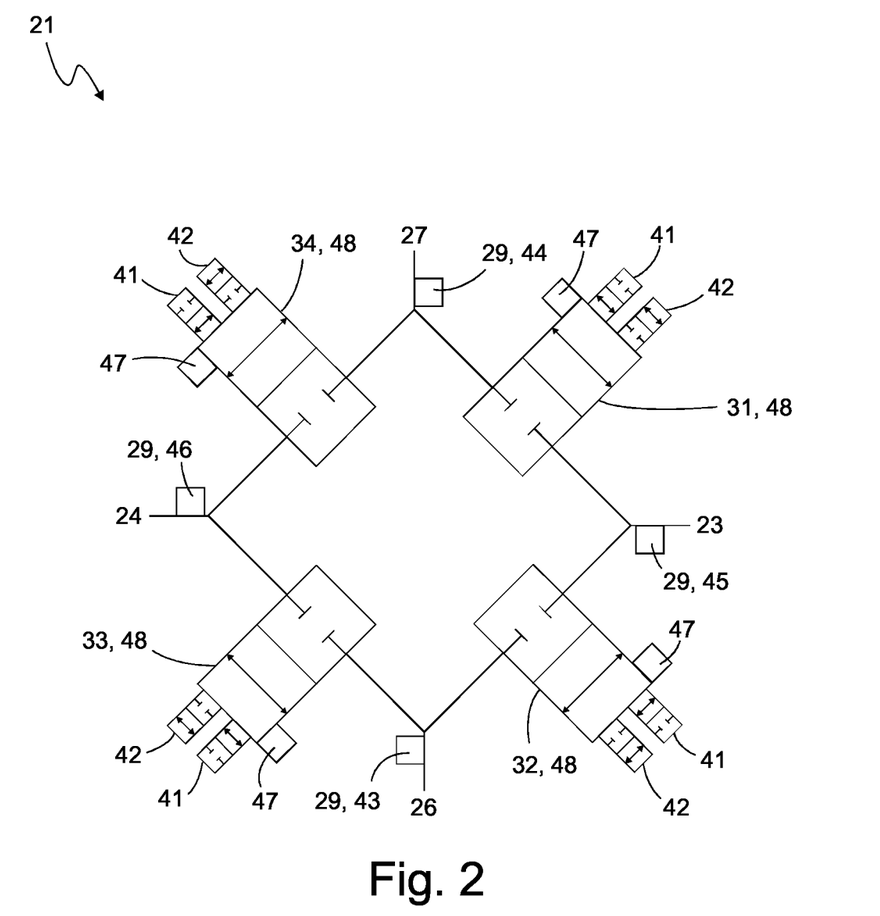

FIG. 2 shows an exemplary valve device 21 with which the pressures for the pressure chambers 8, 9 can be provided. The valve device 21 is part of the compressed-air provision device 4, in particular of the valve arrangement 14, preferably of a valve module 17.

The valve device 21 has the two pressure outputs 23, 24 with which two separate compressed air pressures and/or two separate compressed air mass flows can be provided. The valve device 21 further has a de-aeration port 26 connected to a de-aeration line and an aeration port 27 connected to an aeration line. Expediently, a supply pressure is applied to the aeration port 27 and/or the atmospheric pressure is applied to the de-aeration port 26.

For each pressure output 23, 24, the valve device 21 comprises one or more valve members 48 by means of which the size of a respective output opening through which compressed air is passed when it is supplied to or discharged from a respective pressure output 23, 24 can be adjusted.

In FIG. 2, the valve device 21 is exemplarily designed as a full bridge having four 2/2-way valves 31, 32, 33, 34. A first 2/2-way valve 31 is connected between the aeration port 27 and the first pressure output 23, a second 2/2-way valve 32 is connected between the first pressure output 23 and the de-aeration port 26, a third 2/2-way valve is connected between the de-aeration port 26 and the second pressure output 24, and a fourth 2/2-way valve is connected between the second pressure output 24 and the aeration port 27.

The first pressure output 23 can selectively be connected to the de-aeration line via the first 2/2-way valve or to the aeration line via the second 2/2-way valve, and the second pressure output 24 can selectively be connected to the de-aeration line via the third 2/2-way valve or to the aeration line via the fourth 2/2-way valve.

Each 2/2-way valve 31, 32, 33, 34 is exemplarily designed as a proportional valve; i.e., each 2/2-way valve 31, 32, 33, 34 has a valve member 48 that can be moved to an open position, a closed position, and any intermediate positions between the open and closed positions. Preferably, the 2/2-way valves 31, 32, 33, 34 are pilot operated valves, each having two pilot valves 41, 42 through which the valve member can be actuated. The pilot valves 41, 42 are exemplarily designed as piezo valves. The position of the respective valve member 48 can be used to adjust the aforementioned output opening.

Exemplarily, the first and second 2/2-way valves 31, 32 form a first half bridge and the third and fourth 2/2-way valves 33, 34 form a second half bridge. Preferably, the output opening of the first pressure output 23 is adjustable via the first half-bridge and the output opening of the second pressure output 24 is adjustable via the second half-bridge.

The valve arrangement 14 expediently includes the pressure sensor arrangement 29 having one or more pressure sensors to sense pressures of the valve arrangement 14, in particular the valve device 21.

Exemplarily, the pressure sensor arrangement 29 comprises a first pressure output pressure sensor 45 for sensing the pressure provided at the first pressure output 23 and/or a second pressure output pressure sensor 46 for sensing the pressure provided at the second pressure output 24. Expediently, the pressure sensor arrangement 29 further comprises a supply air pressure sensor 44 for sensing pressure provided at the aeration port 27 and/or an exhaust air pressure sensor 43 for sensing pressure provided at the de-aeration port 26.

The valve arrangement 14, in particular the valve device 21, expediently comprises stroke sensors 47 for detecting the position of the valve members 48. The compressed-air provision device 4 is in particular designed to determine the size of the output openings of the pressure outputs 23, 24 by means of the stroke sensors 47.

In the following, the closed-loop position control performed by the compressed-air provision device 4 will be discussed in more detail:

The compressed-air provision device 4 is expediently designed to perform the closed-loop position control over the entire movement path of the actuator element 3. Preferably, the compressed-air provision device 4 is designed to position the actuator element 3 at any position along the movement path by means of the closed-loop position control. Expediently, the actuator element 3 can be positioned at any desired position along the movement path by the closed-loop position control.

Preferably, the compressed-air provision device comprises a closed-loop position controller with which the closed-loop position control of the actuator element 3 is provided. The closed-loop position controller is expediently implemented as a program, in particular as an application program, which is executed in particular on the valve arrangement 14, preferably on the control unit 19. In particular, the closed-loop position controller 50 is executed on a microcontroller of the control unit 19. Alternatively or additionally, the closed-loop position controller 50 can also be executed on the cloud server 16 and/or the higher-level controller 15.

The closed-loop position controller is expediently designed to provide a manipulated variable signal based on a setpoint signal. The setpoint signal is provided, for example, by the control unit 19, the controller 15 and/or the cloud server 16. The setpoint signal specifies the desired position. The valve arrangement 14 is designed to control the valve device 21, in particular the 2/2-way valves 31, 32, 33, 34, in particular their pilot valves 41, 42, on the basis of the manipulated variable signal. By way of example, one or more conductance values (in German Leitwerte) are specified by the manipulated variable signal, according to which conductance values the positions of the valve members 48—and thus the output openings of the pressure outputs 23, 24—are set.

In particular, the closed-loop position controller is designed to provide the manipulated variable signal as a function of the setpoint signal and/or a measured variable signal.

The measured variable signal expediently comprises measured values of the position sensor device 10, the pressure sensor arrangement 29, in particular the pressure sensors 43, 44, 45, 46, and/or the stroke sensors 47. Thus, the measured variable signal comprises, in particular, a measured position of the actuator element 3, a measured pressure at the de-aeration port 26, a measured pressure at the aeration port 27, a measured pressure at the pressure output 23, a measured pressure at the pressure output 24, and/or the measured positions of the valve members 48. The measured pressures can expediently be provided in the measured variable signal as pressure differences. Furthermore, the measured positions can be provided in the measured variable signal as conductance values.

The compressed-air provision device 4, in particular the position controller, is designed to take the friction information and/or the mass information into account when closed-loop controlling the position of the actuator element 3.

The friction information describes a friction, in particular a friction coefficient and/or a friction force, which occurs during the positioning of the actuator element 3. Expediently, the friction information comprises a friction parameter describing this friction. For example, the friction comprises the friction between the actuator element 3 and the actuator body 7, in particular between the piston 5 and the actuator body 7. Alternatively or additionally, the friction expediently comprises the friction between a drive object driven by the actuator element and a guide on which the drive object is mounted.

The mass information describes a mass to be set in motion when positioning the actuator element 3. Expediently, the mass information comprises a mass parameter describing this mass. For example, the mass comprises the mass of the actuator element 3. Alternatively or additionally, the mass expediently comprises the mass of a drive object driven by the actuator element 3.

Expediently, the compressed-air provision device 4, in particular the closed-loop position controller, is designed to calculate one or more closed-loop controller parameters, for example closed-loop controller gains, for the closed-loop position control on the basis of the friction information and/or the mass information and to use these closed-loop controller parameters in the closed-loop position control. Preferably, the compressed-air provision device 4, in particular the closed-loop position controller, is designed to perform a closed-loop controller design on the basis of the friction information and/or the mass information in order to calculate the closed-loop controller parameters, in particular the closed-loop controller gains, for the closed-loop position control. Expediently, the compressed-air provision device 4 is designed to perform an autoparameterization of the closed-loop position control on the basis of the friction information and/or the mass information.

The closed-loop position control can be adapted to a specific application and/or to the pneumatic actuator 2 by means of the mass information and/or the friction information.

Expediently, the system 100 has a user interface for manually entering the friction information and/or the mass information. The input is expediently performed directly at the place of use of the system 100, exemplarily during commissioning of the system 100. Expediently, the closed-loop position controller and/or the assistance procedure is provided in an application program and the input of the friction information and/or the mass information is performed by means of or in the application program. Exemplarily, the aforementioned user device 49 serves as the user interface.

The mass information and/or the friction information is in particular a parameter that can be entered by a user, for example via the user device 49.

In the following, the assistance procedure will be discussed in more detail.

The compressed-air provision device 4 is expediently configured to trigger the assistance procedure automatically, for example in a commissioning mode. Alternatively or additionally, the user interface of the system 100, for example the user device 49, comprises the function for manually—i.e. selectively effected by explicit user input—triggering the assistance procedure.

The assistance procedure is expediently executed on the control unit 19, the controller 15, the external cloud server 16 and/or the user device 49, in particular as an application program.

The compressed-air provision device 4 is adapted to supply compressed air to the pneumatic actuator 2 as part of the assistance procedure to set the actuator element 3 in an oscillation movement 60, in which the actuator element 3 moves alternately in a first direction of movement 61 and in a second direction of movement 62. The compressed-air provision device 4 is configured to detect pressure values of the compressed air and position values of the actuator element 3 during the oscillation movement 60, and to determine and/or verify the friction information and/or the mass information based on the detected pressure values and the detected position values.

Figure 3:
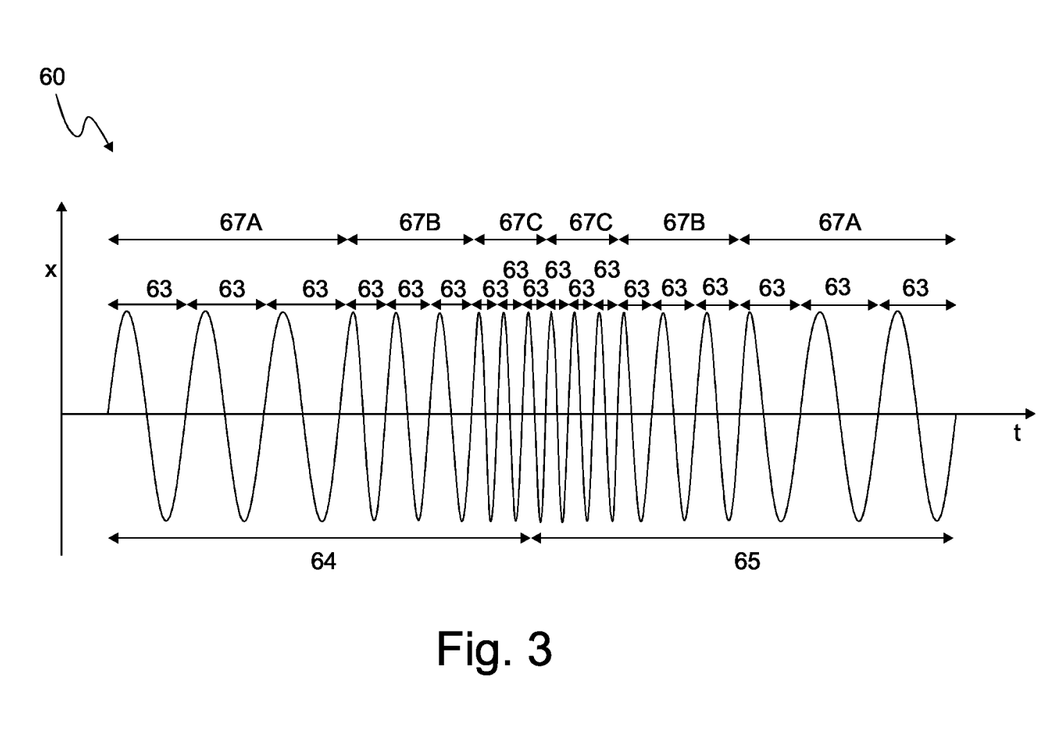

FIG. 3 shows a diagram of an exemplary oscillation movement 60 into which the actuator element 3 is set during the assistance procedure. In the diagram of FIG. 3 the position x of the actuator element 3 is plotted against time t.

During the oscillation movement 60, the actuator element 3 moves along the movement path. The oscillation movement 60 is sinusoidal in particular. The oscillation movement 60 has a plurality of periods 63.

The compressed-air provision device 4 is preferably configured to vary the speed of the actuator element 3 during the oscillation movement 60 so that a plurality of periods 63 of the oscillation movement 60 differ from each other in their speed course, in particular in their maximum speed, and to detect the pressure values and the position values over the plurality of periods 63. In particular, the compressed-air provision device 4 uses pressure values and position values acquired over a plurality of periods 63 differing from each other in their speed course, in particular in their maximum speed, for determining and/or verifying the friction information and/or the mass information.

As shown in FIG. 3, a plurality of periods 63 of the oscillation movement 60 differ from each other in their speed course. In particular, several periods 63 differ from each other in their maximum speed.

Exemplarily, the oscillation movement 60 comprises a plurality of speed phases 67A, 67B, 67C, each comprising a plurality of periods 63. Alternatively, one, several or all speed phases 67A, 67B, 67C may comprise only one period 63 each. The respective periods 63 of a speed phase expediently each have the same speed course, in particular the same maximum speed. The speed phases 67A, 67B, 67C expediently differ from one another in their speed course, in particular in their maximum speed. FIG. 3 shows three different speed phases 67A, 67B, 67C. Preferably, the oscillation movement 60 comprises at least three, in particular at least six different speed phases.

The various speed phases or periods 63 can be generated, in particular, by one or to more frequency sweeps.

The compressed-air provision device 4 is preferably configured to perform at least one frequency sweep of the oscillation movement 60 and to detect the pressure values and the position values during the frequency sweep. Exemplarily, the different speed phases and/or periods with different speed courses are obtained by performing the frequency sweep—that is, by varying the frequency of the oscillation movement 60.

Exemplarily, the compressed-air provision device 4 is configured to perform at least a first frequency sweep 64 of the oscillation movement 60 and a second frequency sweep 65 of the oscillation movement and to detect the pressure values and the position values during both frequency sweeps 64, 65. The first frequency sweep 64 is exemplarily a frequency sweep with increasing frequency and the second frequency sweep 65 is exemplarily a frequency sweep with decreasing frequency.

Exemplarily, the speed phases 67A, 67B, 67C of the oscillation movement 60 differ from each other in frequency. The frequency of the second speed phase 67B is greater than the frequency of the first speed phase 67A, and the frequency of the third speed phase 67C is greater than the frequency of the second speed phase 67B. In each frequency sweep 64, 65, multiple speed phases 67A, 67B, 67C are swept at different frequencies.

The compressed-air provision device 4 is designed to detect pressure values of the compressed air and position values of the actuator element 3 during the oscillation movement 60, in particular during each frequency sweep 64, 65. The detected pressure values expediently comprise the pressures at the pressure outputs 23, 24 detected by the pressure sensor arrangement 29. Based on the pressure values and position values detected during the frequency sweeps 64, 65, the friction information and/or the mass information is calculated.

As explained in detail below, the compressed-air provision device 4 is expediently configured to calculate a friction acting on the actuator element 3 based on the pressure values and the position values. In particular, the compressed-air provision device 4 is configured to calculate a friction curve 66 (shown in FIGS. 4 and 5) of the friction acting on the actuator element 3. The friction may also be referred to as friction force. The friction curve may also be referred to as friction force curve.

Figure 4:
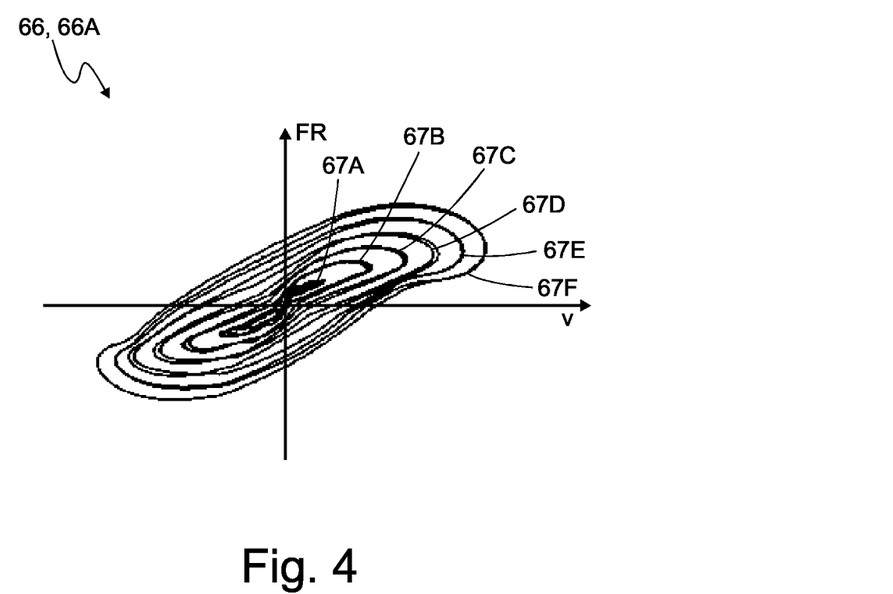
Figure 5:
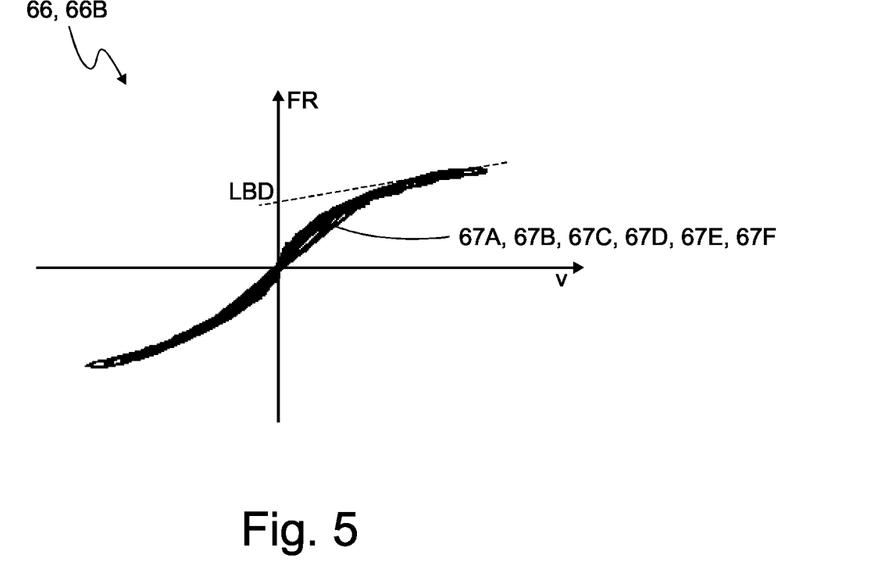

The compressed-air provision device 4 is expediently designed to calculate the friction information and/or the mass information on the basis of the friction curve 66, as will be explained in more detail below. First, the calculation of the friction curve 66 will be discussed in more detail.

Exemplarily, the compressed-air provision device 4 is designed to calculate the friction of the friction curve 66 as the difference between a first pneumatic force acting on the actuator element 3 in the first direction of movement 61, a second pneumatic force acting on the actuator element 3 in the second direction of movement 62, an inertial force resulting from the acceleration of the actuator element 3 and/or gravity acting on the actuator element 3. The compressed-air provision device 4 is designed in particular to calculate the first pneumatic force and/or the second pneumatic force on the basis of the detected pressure values.

For example, the compressed-air provision device 4 is configured to calculate the friction curve 66 based on the following equation of motion:

$$F_R = F_{AD} - F_{LD} - m \cdot (\ddot{x} + g \cdot \sin \alpha)$$

$F_R$ is the friction.

$F_{AD}$ is the first pneumatic force acting in the first direction of movement 61, which first pneumatic force is provided by pressurizing the first pressure chamber 8 with compressed air. For example, $F_{AD}$ is calculated as the product of the pressure $p_{AD}$ of the first pressure chamber 8 and the first effective area $A_{AD}$ of the actuator element 3 on which the pressure $p_{AD}$ acts. $F_{AD}$ is thus obtained as $F_{AD} = p_{AD} \cdot A_{AD}$. The pressure $p_{AD}$ is preferably calculated based on the pressure value of the first pressure output 23 detected by the pressure sensor arrangement 29. According to an alternative embodiment (in which a pressure sensor is present at the actuator 2), the pressure $p_{AD}$ can also be measured as a pressure value directly at the actuator 2.

$F_{LD}$ is the second pneumatic force acting in the second direction of movement 62, which second pneumatic force is provided by pressurizing the second pressure chamber 9 with compressed air and/or by an ambient pressure acting on the actuator element 3, in particular the piston rod 6. Exemplarily, $F_{LD}$ comprises the product of the pressure $p_{LD}$ of the second pressure chamber 9 and the second effective area $A_{LD}$ of the actuator element 3 on which the pressure $p_{LD}$ acts. Exemplarily, $F_{LD}$ further comprises the product of the ambient pressure $p_{AMB}$, in particular the atmospheric pressure, and a third effective area of the actuator element 3 on which the ambient pressure $p_{AMB}$ acts. Exemplarily, the third effective area results as the difference of the first effective area $A_{AD}$ and the second effective area $A_{LD}$. $F_{LD}$ is thus obtained as $F_{LD} = p_{LD} \cdot A_{LD} + p_{AMB} \cdot (A_{AD} - A_{LD})$. Preferably, the pressure $p_{LD}$ is calculated based on the pressure value of the second pressure output 24 detected by the pressure sensor arrangement 29. According to an alternative embodiment (in which a pressure sensor is present at the actuator 2), the pressure $p_{LD}$ can also be measured as a pressure value directly at the actuator 2.

m is the mass to be set in motion when positioning the actuator element 3; in particular, m represents the mass information, for example the mass parameter. M is, for example, the mass of the actuator element 3 plus (if present) the mass of a drive object to be driven with the actuator element 3.

$\ddot{x}$ is the acceleration of the actuator element and is obtained, for example, by differentiating twice the position values of the actuator element 3 detected in particular with the position sensor device 10.

g is the acceleration due to gravity.

α is the mounting orientation of the actuator element 3. In particular α is the angle between the movement path of the actuator element 3 and the horizontal plane (aligned perpendicular to the acceleration due to gravity).

As explained above, the pressures $p_{AD}$ and $p_{LD}$ of the pressure chambers 8, 9 are exemplarily calculated based on the pressure values of the pressure outputs 23, 24 detected with the pressure sensor arrangement 29. The pressure values detected with the pressure sensor arrangement 29 may also be referred to as measurement pressures, and the pressures $p_{AD}$ and $p_{LD}$ calculated on the basis of the measurement pressures may also be referred to as calculation pressures. In particular, the calculation pressures are estimated pressures.

Thus, the compressed-air provision device 4 is preferably configured to measure measurement pressures of the compressed-air provision device 4 with the pressure sensor arrangement 29, to provide the measurement pressures as the pressure values, and to calculate calculation pressures based on the measurement pressures that represent the pressures prevailing in the pressure chambers 8, 9 of the pneumatic actuator 2. The compressed-air provision device 4 is further adapted to determine and/or verify the friction information and/or the mass information based on the calculation pressures.

Preferably, the compressed-air provision device 4 is designed to use a tube model of the tube arrangement 28 for calculating the calculation pressures. The tube model represents the influence of the tube on the pressure. The tube model describes the dependence of the respective pressure in the pressure chamber 8, 9 on the respective pressure at the pressure output 23, 24. Preferably, the calculation pressures are calculated on the basis of the pressure values and the position values.

In the following, with reference to FIGS. 4 and 5, it will be discussed in more detail how the friction information and/or the mass information can be determined based on the friction curve 66.

The friction curves 66 shown in FIGS. 4 and 5 are parameter curves, for example. The points of the friction curves 66 are each defined by a time-dependent friction $F_R$ (t) and a time-dependent speed v (t) of the actuator element 3. The points of the friction curves are traversed as a function of time t. The time-dependent friction $F_R$ is plotted on the y-axis and the time-dependent speed v of the actuator element 3 during the oscillation movement 60 is plotted on the x-axis. The speed v shall also be referred to as the oscillation speed v. The time-dependent speed v is calculated, for example, by differentiating the sensed position of the actuator element 3.

The friction curve 66 shown in FIG. 4 shall also be referred to as the non-optimized friction curve 66A. As explained below, the non-optimized friction curve 66A is based on an incorrect assumption for the mass information, in particular for the mass parameter m. The friction curve 66 shown in FIG. 5 shall also be referred to as the optimized friction curve 66B. As explained below, the optimized friction curve 66B is based on a correct assumption for the mass information, in particular for the mass parameter m. The friction curves 66A, 66B thus differ by the respective selected mass parameter m with which the respective friction Fr was calculated.

As mentioned above, the friction curve 66 is calculated using pressure values recorded during the oscillation movement 60. In this context, it should be mentioned that, for ease of presentation, a different oscillation movement 60 is shown in FIG. 3 than the oscillation movement on which the friction curves 66 shown in FIGS. 4 and 5 are based. For example, the oscillation movement 60 of FIG. 3 has fewer speed phases than the friction curve 66 of FIG. 4.

The non-optimized friction curve 66A has multiple speed phases corresponding to the speed phases of the underlying oscillation movement. Exemplarily, the friction curve 66A has speed phases 67A, 67B, 67C, 67D, 67E, and 67F. Each of the speed phases spans one or more periods of oscillation movement. The non-optimized friction curve has a plurality of periods corresponding to the periods of the underlying oscillation movement.

The non-optimized friction curve 66A has a spiral shape. In each period, the friction curve 66A revolves once around the zero point. In each period—i.e. for each revolution around the zero point—the friction curve 66A passes through each of the four quadrants of the diagram. With increasing maximum speed, i.e. exemplarily with increasing frequency, of the speed phases, in particular of the periods, the distance of the friction curve 66A to the coordinate origin increases, so that the friction curve has a spiral course. For each speed value v of the friction curve 66A, a plurality of different friction values are given. The friction curve 66A has a hysteresis. Depending on whether the speed v increases or decreases, significantly different frictions result (for the same speed v), for example, both positive and negative frictions result for the same speed v due to the hysteresis. This course of the friction curve 66A results from an incorrect assumption for the mass parameter m.

The compressed-air provision device 4 is adapted to perform parameter optimization of the mass parameter m in the friction curve 66 to obtain the optimized friction curve 66B. For example, the compressed-air provision device 4 performs a recursive least square method to obtain the optimized friction curve 66B based on the non-optimized friction curve 66A. The compressed-air provision device 4 is configured to calculate at which mass parameter value of the mass parameter m a deviation, in particular a hysteresis, of the friction curve 66 between different periods, in particular between different speed phases, is minimal, and to provide that mass parameter value at which the deviation is minimal as the mass information, in particular the mass parameter m.

Exemplarily, the compressed-air provision device 4 is configured to use a cost function to calculate at which mass parameter value the deviation is minimal. For example, the compressed-air provision device 4 performs a minimization of a cost function, for example $\min\Sigma F_R^2$ to obtain the mass parameter value. Expediently, the compressed-air provision device 4 performs the minimization of the cost function under the constraint that the mass parameter m is greater than zero.

The optimized friction curve 66B shown in FIG. 5 is the result of minimizing the cost function. Here, the different periods, in particular the different speed phases, are located essentially on a single friction characteristic, in which there is a (substantially) unambiguous assignment between the speed values v and the friction values Fr, so that each speed value v has only one friction value Fr assigned to it.

Exemplarily, the optimized friction curve 66B has an essentially S-shaped course. The optimized friction curve 66B runs through the zero point. Exemplarily, the optimized friction curve 66B passes through the first quadrant and the third quadrant (and in particular does not pass through the second quadrant and fourth quadrant). The optimized friction curve 66B has a negative curvature in the first quadrant and a positive curvature in the third quadrant.

The compressed-air provision device 4 is configured to determine the friction information based on the optimized friction curve 66B. For example, based on the optimized friction curve 66B, the compressed-air provision device 4 generates a friction function describing the friction Fr as a function of the speed v and being located on the optimized friction curve 66B. This friction function expediently represents the friction information.

Furthermore, the compressed-air provision device 4 can be designed to calculate an in particular speed-independent Coulomb friction LBD of the actuator element 3 on the basis of the friction information. As shown in FIG. 5, for example, an end portion of the friction curve 66B spaced from the zero point can be extrapolated (in particular by means of a straight line) towards the y-axis. The friction Fr at which the extrapolation intersects the y-axis is expediently provided as the Coulomb friction LBD. Expediently, the compressed-air provision device 4 is designed to store the Coulomb friction LBD, to use it in the closed-loop position control and/or to output it, for example via the user device 49.

As explained above, the compressed-air provision device 4 is thus designed to calculate, on the basis of the pressure values and the position values, the friction curve 66, extending over a plurality of periods 63 of the oscillation movement 60, of the friction acting on the actuator element 3 as a function of the oscillation movement 60, in particular the oscillation speed v, and to calculate the friction information and/or the mass information using the friction curve 66. The friction of the friction curve depends on the mass parameter m, which describes the mass to be set in motion when positioning the actuator element 3. The compressed-air provision device 4 is adapted to calculate at which mass parameter value of the mass parameter m a deviation of the friction curve 66 between different periods 63 of the oscillation movement is minimal, and to provide that mass parameter value at which the deviation is minimal as the mass information m. The compressed-air provision device 4 is configured to determine the friction information based on that friction curve 66 at which the deviation is minimum.

According to a preferred embodiment, the compressed-air provision device 4 is configured to verify friction information, for example a friction parameter, entered by a user and/or mass information, for example a mass parameter, entered by a user. For example, the compressed-air provision device 4 is adapted to compare the entered friction information with the determined friction information. If the entered friction information does not match the determined friction information, the compressed-air provision device 4 expediently outputs a warning to the user, for example via the user device 49, and/or uses the determined friction information instead of the entered friction information for the closed-loop position control.

For example, the compressed-air provision device 4 compares the entered mass information with the determined mass information. If the entered mass information does not match the determined mass information, the compressed-air provision device 4 issues a warning to the user, for example via the user device 49, and/or uses the determined mass information instead of the entered mass information for the position control.

According to a preferred embodiment, the compressed-air provision device 4 is designed to use the friction information and/or mass information determined with the assistance procedure to determine a wear condition, for example an aging condition, of the compressed-air provision device 4 and/or the pneumatic actuator 2. In particular, the compressed-air provision device 4 is designed to provide a predictive maintenance function and, for example, to detect aging and/or a defect using the determined wear condition. In particular, the friction information and/or the mass information serves as the basis for determining the wear condition.

Thus, as explained above, the compressed-air provision device 4 is expediently configured to calculate the friction information and/or the mass information using an equation of motion of the actuator element 3 and the detected pressure values and the detected position values of the actuator element. Exemplarily, the compressed-air provision device 4 estimates the pressures in the pressure chambers 8, 9 based on the detected pressure values using a tube model and uses the estimated pressures to calculate the friction information and/or the mass information. Preferably, the compressed-air provision device 4 does not employ a model function (in German: Ansatzfunktion) for calculating the friction information and/or the mass information. Furthermore, expediently, the cost function used to calculate the optimized friction curve is freely selectable.

Expediently, a simplified commissioning of the system 100 is realized by the described measures. The compressed-air provision device 4 identifies the friction, in particular the friction information, of the actuator element 3 by a learning run—in particular by the oscillation movement 60. The parameter identification of the friction is performed by a parameter optimization (e.g. by a recursive least square method) on the motion equation of the actuator element. The equation of motion may also be referred to as the dynamics equation. Preferably, the user does not have to determine the friction information himself/herself.

The mass information is plausibilized (i.e. verified) or identified by the learning run—in particular the oscillation movement. The parameter identification is done by applying a parameter optimization (e.g. by a recursive least square method) to the equation of motion of the actuator.

What is claimed is:

1. A system, comprising a pneumatic actuator which can be acted upon by compressed air and has an actuator element, and a compressed-air provision device which is configured to carry out a closed-loop position control of the actuator element by applying compressed air to the pneumatic actuator, in order to set the actuator element in a desired position, wherein the compressed-air provision device is further configured to execute an assistance procedure and, within the assistance procedure:
   to set the actuator element into an oscillation movement by applying compressed air to the pneumatic actuator, in which oscillation movement the actuator element moves alternately in a first direction of movement and in a second direction of movement,
   to detect pressure values of the compressed air and position values of the actuator element during the oscillation movement, and
   to determine and/or verify, on the basis of the detected pressure values and the detected position values, friction information which describes friction occurring during the positioning of the actuator element and/or mass information which describes a mass to be set in motion during the positioning of the actuator element.

2. The system according to claim 1, wherein the oscillation movement is a sinusoidal oscillation movement.

3. The system according to claim 1, wherein the compressed-air provision device is configured to vary the speed of the actuator element during the oscillation movement such that a plurality of periods of the oscillation movement differ from each other in their speed characteristics, and to detect the pressure values and the position values over the plurality of periods.

4. The system according to claim 1, wherein the compressed-air provision device is configured to perform at least one frequency sweep of the oscillation movement and to detect the pressure values and the position values during the frequency sweep.

5. The system according to claim 1, wherein the compressed-air provision device is configured to perform at least a first frequency sweep of the oscillation movement and a second frequency sweep of the oscillation movement and to detect the pressure values and the position values during both frequency sweeps, wherein the first frequency sweep is a frequency sweep with increasing frequency and the second frequency sweep is a frequency sweep with decreasing frequency.

6. The system according to claim 1, wherein the compressed-air provision device is configured to determine and/or verify the friction information and/or the mass information on the basis of the detected pressure values, a movement equation describing the movement of the actuator element and the detected position values of the actuator element.

7. The system according to claim 1, wherein the compressed-air provision device is configured to calculate, on the basis of the pressure values and the position values, a friction curve of the friction acting on the actuator element as a function of the oscillation movement, the friction curve extending over a plurality of periods of the oscillation movement, and to calculate the friction information and/or the mass information using the friction curve.

8. The system according to claim 7, wherein the compressed-air provision device is configured to calculate the friction curve as a function of the oscillation speed.

9. The system according to claim 7, wherein the friction of the friction curve depends on a mass parameter describing the mass to be set in motion when positioning the actuator element, and the compressed-air provision device is configured to calculate at which mass parameter value of the mass parameter a deviation of the friction curve between different periods is minimal, and to provide that mass parameter value at which the deviation is minimal as the mass information.

10. The system according to claim 9, wherein the compressed-air provision device is configured to determine the friction information based on that friction curve at which the deviation is minimal.

11. The system according to claim 9, wherein the compressed-air provision device is configured not to use a further model function for the calculation of the friction information and/or the mass information.

12. The system according to claim 7, wherein the compressed-air provision device is configured to calculate the friction of the friction curve as the difference between a first pneumatic force acting on the actuator element in the first direction of movement, a second pneumatic force acting on the actuator element in the second direction of movement, an inertial force resulting from the acceleration of the actuator element, and/or gravity acting on the actuator element.

13. The system according to claim 12, wherein the compressed-air provision device is configured to calculate the first pneumatic force and/or the second pneumatic force based on the pressure values.

14. The system according to claim 1, wherein the compressed-air provision device is configured to perform the closed-loop position control taking into account the friction information and/or the mass information.

15. The system according to claim 1, wherein the compressed-air provision device comprises a pressure sensor arrangement, and is configured to measure measurement pressures of the compressed-air provision device with the pressure sensor arrangement, to provide the measurement pressures as the pressure values and to calculate, on the basis of the pressure values, calculation pressures representing an estimate of the pressures present in the pressure chambers of the pneumatic actuator, and to determine and/or verify the friction information and/or the mass information on the basis of the calculation pressures.

16. The system according to claim 1, wherein the compressed-air provision device is adapted to calculate a Coulomb friction of the actuator element based on the determined friction information.

17. A method of operating a system, comprising a pneumatic actuator which can be acted upon by compressed air and has an actuator element, and a compressed-air provision device which is configured to carry out a closed-loop position control of the actuator element by applying compressed air to the pneumatic actuator, in order to set the actuator element in a desired position, wherein the compressed-air provision device is further configured to execute an assistance procedure, the method including the step of performing the assistance procedure and, within the assistance procedure:

to set the actuator element into an oscillation movement by applying compressed air to the pneumatic actuator, in which oscillation movement the actuator element moves alternately in a first direction of movement and in a second direction of movement, to detect pressure values of the compressed air and position values of the actuator element during the oscillation movement, and to determine and/or verify, on the basis of the detected pressure values and the detected position values, friction information which describes friction occurring during the positioning of the actuator element and/or mass information which describes a mass to be set in motion during the positioning of the actuator element.

* * * * *